US007676820B2

(12) United States Patent
Snijder et al.

(10) Patent No.: US 7,676,820 B2
(45) Date of Patent: Mar. 9, 2010

(54) METHOD AND APPARATUS FOR SIMILAR VIDEO CONTENT HOPPING

(75) Inventors: Freddy F. Snijder, Eindhoven (NL); Jan A. D. Nesvadba, Eindhoven (NL); Mauro M. Barbieri, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 400 days.

(21) Appl. No.: 10/540,313

(22) PCT Filed: Dec. 19, 2003

(86) PCT No.: PCT/IB03/06241

§ 371 (c)(1),
(2), (4) Date: Feb. 27, 2006

(87) PCT Pub. No.: WO2004/061711

PCT Pub. Date: Jul. 22, 2004

(65) Prior Publication Data
US 2006/0184963 A1 Aug. 17, 2006

Related U.S. Application Data

(60) Provisional application No. 60/438,220, filed on Jan. 6, 2003.

(51) Int. Cl.
*H04H 60/32* (2008.01)
*G06F 3/00* (2006.01)
*G06F 13/00* (2006.01)
*H04N 5/445* (2006.01)

(52) U.S. Cl. .................... 725/19; 725/46; 725/134; 715/723; 382/119; 348/161

(58) Field of Classification Search .................... 725/19, 725/46, 134; 715/723; 382/119; 348/161
See application file for complete search history.

(56) References Cited

U.S. PATENT DOCUMENTS 5,436,653 A * 7/1995 Ellis et al. ..................... 725/22
5,521,841 A    5/1996 Arman et al.
5,621,454 A * 4/1997 Ellis et al. ..................... 725/22
6,259,817 B1 * 7/2001 Ahmad ........................ 382/236
6,366,296 B1 * 4/2002 Boreczky et al. ............. 715/719
6,473,459 B1 * 10/2002 Sugano et al. .......... 375/240.16
6,542,546 B1 * 4/2003 Vetro et al. ............. 375/240.12
6,633,651 B1 * 10/2003 Hirzalla et al. .............. 382/100

(Continued)

FOREIGN PATENT DOCUMENTS

JP    2001/177788 A    6/2001
WO    WO0221529 A      3/2002

OTHER PUBLICATIONS

Hong Jiang et al; "An Integrated system for Content-Based Video Retrieval and Browsing" Pattern Recognition, Pergamon Press Inc., Elmsford, NY, vol. 30, No. 4, Apr. 1, 1997, pp. 643-658, XP0044059159.

*Primary Examiner*—Brian T Pendleton
*Assistant Examiner*—Pinkal Chokshi

(57) ABSTRACT

An apparatus for playing video content includes a play means (100) for playing video content. The video content includes overlapping scenes (621, 622, 641, 642, 661, 662, 681, 682), with each scene having an associated scene signature. A scene hopping selector (44) is operative while the play means (100) is playing video content for selecting a hop. The selecting defines a current scene (102) which the play means (100) is playing at a time of the selection, and a current scene signature corresponding to the current scene (102). A similar scene hopping processor (104) operates responsive to a defining of a current scene (102). The similar scene hopping processor (104) compares the current scene signature with other scene signatures of the video content to identify a similar scene (106). The similar scene hopping processor (104) causes the play means (100) to transfer the playing to the similar scene (106).

23 Claims, 7 Drawing Sheets

U.S. PATENT DOCUMENTS

| | | | |
|---|---|---|---|
| 6,774,917 B1 * | 8/2004 | Foote et al. | 715/700 |
| 6,957,387 B2 * | 10/2005 | Barbieri | 715/719 |
| 7,064,796 B2 * | 6/2006 | Roy et al. | 348/700 |
| 7,103,222 B2 * | 9/2006 | Peker | 382/181 |
| 7,194,752 B1 * | 3/2007 | Kenyon et al. | 725/22 |
| 2002/0069218 A1 * | 6/2002 | Sull et al. | 707/501.1 |
| 2002/0080162 A1 * | 6/2002 | Pan et al. | 345/723 |
| 2008/0092168 A1 * | 4/2008 | Logan et al. | 725/44 |

* cited by examiner

METHOD AND APPARATUS FOR SIMILAR VIDEO CONTENT HOPPING

CROSS REFERENCE TO RELATED APPLICATION

This application claims the benefit of U.S. provisional application Ser. No. 60/438,220 filed Jan. 6, 2003, which is incorporated herein by reference.

The present invention relates to the field of image display systems; more specifically, it relates to a method and system for controlling the contrast of pixels in a displayed image.

The following relates to the entertainment arts. It particularly relates to enabling users of high-capacity personal video recorders to conveniently switch or hop to similar content in the same or different streams. However, the following relates more generally to enabling content hopping in digital broadcast television receivers, digital cable television receivers, compact audio disk players and recorders, digital radio broadcast receivers, Internet browsers, computer network browsers, and the like.

Personal video recorders and players presently have storage capacities of over forty hours of video content, with capacity expected to increase substantially in the foreseeable future. In view of these large storage capacities, users can significantly benefit from tools and functions for intelligently managing, playing, and browsing the video content.

The serendipitous "finding" of interesting entertainment content is of value to viewers. During viewing of broadcast, cable, or satellite television, users commonly engage in channel hopping or surfing, in which the user operates a remote channel selector control to hop between television channels in search of an interesting offering. Users frequently employ channel hopping even though printed and electronic viewing guides that identify television offerings are readily available. However, such channel hopping may not be entirely random, since the user may be familiar with the types of offerings typically shown on certain channels.

Video content recorded by the user, for example using a personal video camera (i.e., camcorder) or a personal video recorder generally will not include a content guide. During playback, the user may want to engage in content hopping of the recorded content. Such content hopping is generally analogous to channel hopping except that the user is hopping between portions of a video stream or between video streams, rather than between television channels.

A problem arises because the user typically does not have a convenient way to identify desirable content hops within a video stream or between streams. The user would benefit from being able to content hop within particular content types, or within content similar to that presently being viewed. Moreover, the user may want to limit content hopping based on similarity to a presently viewed offering or by specifying a particular type of content to hop to (for example, action scenes or a sports program).

The present invention contemplates an improved apparatus and method that overcomes the aforementioned limitations and others.

According to one aspect, an apparatus for playing video content is disclosed. A video content means is provided for storing at least one video stream. Each video stream includes a multiplicity of scenes. Each scene is described by a corresponding scene signature. A selection means is provided for selecting a scene signature which is descriptive of video content of a scene a user wants to view. A means is provided for comparing the selected scene signature with scene signatures of the stored video streams to identify one or more scenes whose scene signature is similar to the selected scene signature. A means is provided for playing the at least one scene whose scene signature is identified as similar to the selected scene signature.

According to another aspect, a method is provided for playing video content. A scene signature is selected which describes a composite of characteristics of frames of a video scene. The selected scene signature is compared with a multiplicity of stored scene signatures which describe scenes of at least one stored video stream to identify at least one scene signature that is similar to the selected scene signature. At least one scene whose scene signature is identified as similar to the selected stream signature is played.

One advantage resides in providing content-based channel hopping within a prerecorded video stream or between video streams.

Another advantage resides in providing content-based hopping based on quantitative, user-specified hopping criteria.

Yet another advantage resides in providing flexible and accurate content-summarizing information for use in content-based hopping.

Numerous additional advantages and benefits will become apparent to those of ordinary skill in the art upon reading the following detailed description of the preferred embodiments.

The invention may take form in various components and arrangements of components, and in various process operations and arrangements of process operations. The drawings are only for the purpose of illustrating preferred embodiments and are not to be construed as limiting the invention.

FIG. 1 diagrammatically shows a personal video recorder and associated entertainment system, with an exemplary satellite television input, along with a remote control that provides for user selection of scene hopping and stream hopping.

FIG. 2 diagrammatically shows suitable components of the personal video recorder for generating and recording scene and stream signature information associated with video content being recorded.

FIG. 3 diagrammatically shows a suitable overlapping arrangement of scenes corresponding to multiple-stream video content.

FIG. 4 diagrammatically shows suitable components of the personal video recorder for performing scene hopping.

Figure 7:
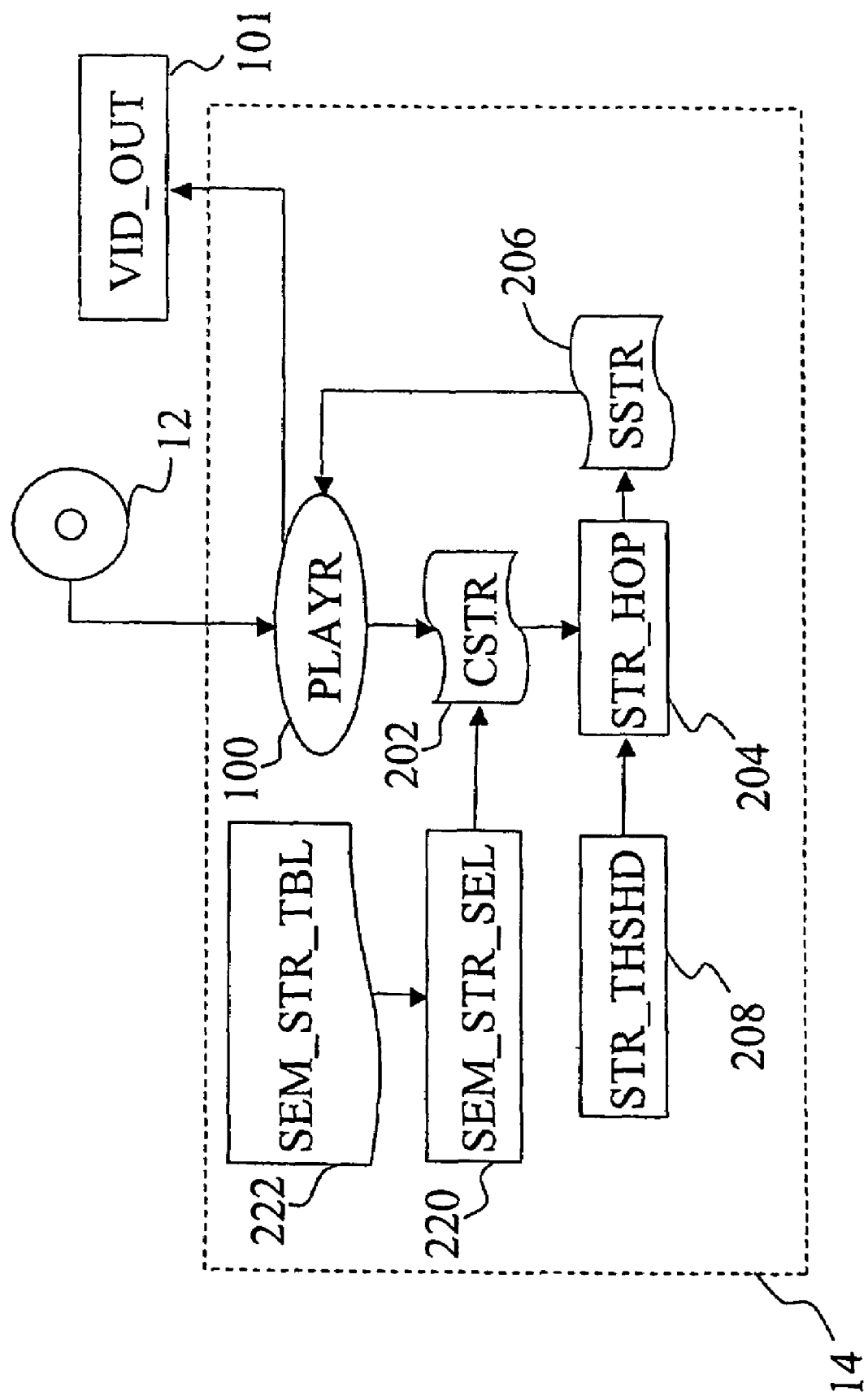

FIG. 7 diagrammatically shows suitable components of the personal video recorder for performing stream hopping.

Figure 1:
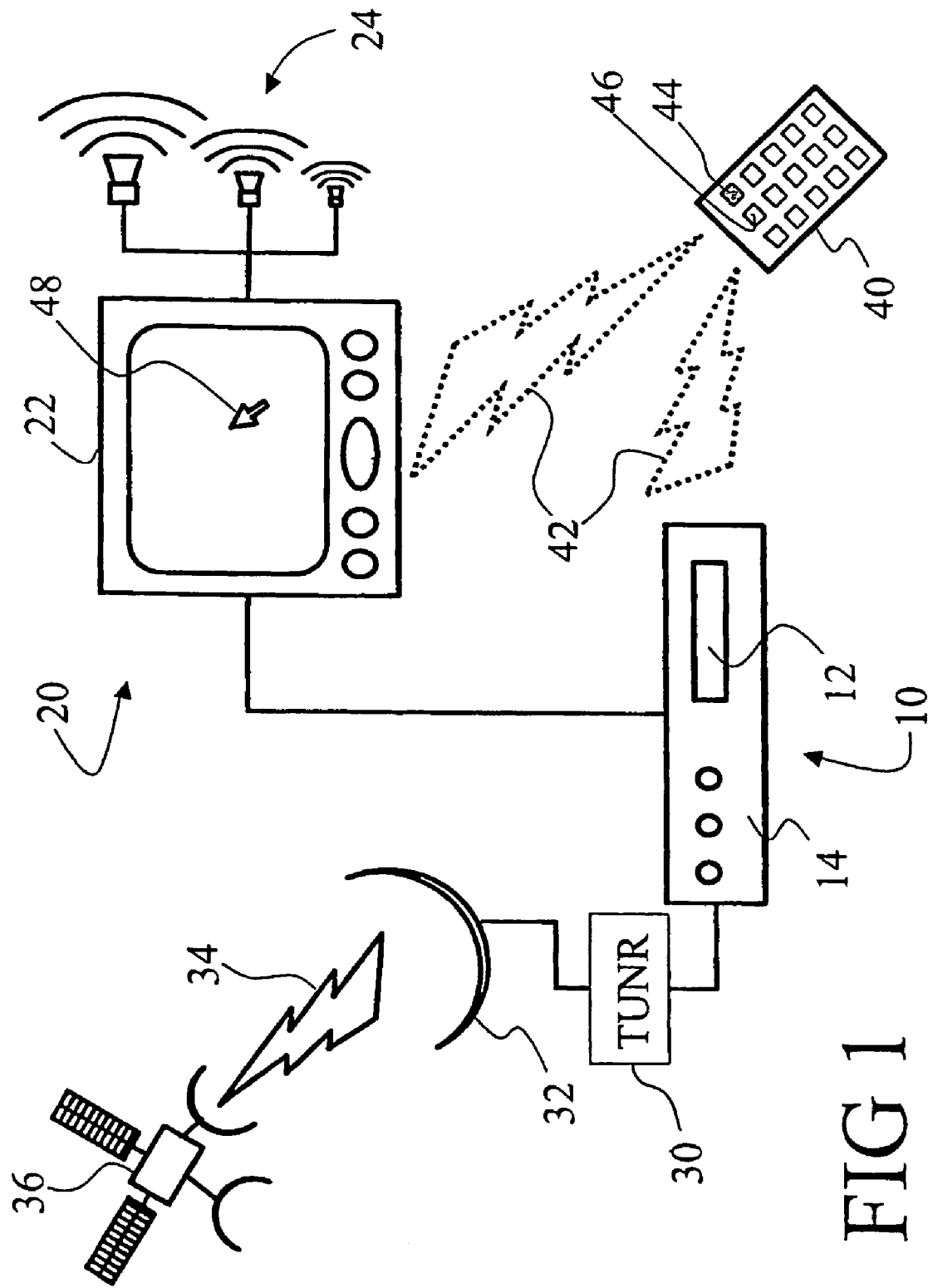

With reference to FIG. 1, a personal video recorder (PVR) 10 includes a hard disk 12 and computer-processor based controller 14. The recorder 10 records one or more streams of input audio/video data while it concurrently plays back the input data, the input data with a delay, or other previously recorded data. With current technology, hard disks with storage capacities of about 40 hours are readily available. Larger storage volumes will become available with higher density memory, multiple disk recording systems, and the like. Although described in conjunction with personal video recorders, it will be appreciated that this technique is also applicable to prerecorded audio/video media, read/write optical disks, computer systems configured to perform personal video recording tasks, and the like.

The personal video recorder 10 outputs playback to an entertainment system 20 that includes a video display 22, which is preferably a high-resolution display, and an audio speaker system 24, which is preferably a high-fidelity audio system. Although shown separately, in some embodiments the audio speaker or speakers are physically integrated into the video display device. Moreover, the personal video recorder can be physically integrated with the entertainment system 20. The personal video recorder 10 is also connected to an external source of video and/or audio input, such as a satellite television tuner 30 communicating with a satellite dish 32 that receives a satellite television signal 34 broadcast by a satellite 36. Other suitable audio/video inputs include broadcast television, cable television, broadcast radio, digital radio, and the lice. Optionally, the television tuner 30 is integrated into the personal video recorder 10 or into the entertainment system 20.

A user controls the personal video recorder 10, the entertainment system 20, television tuner 30, and optionally other components using a handheld remote controller 40 which transmits infrared signals 42 that are received by the personal video recorder 10, the entertainment system 20, television tuner 30, or other components to be controlled. The remote controller 40 includes buttons, rotary dials, or other controls suitable for inputting user commands. In particular, the remote controller 40 includes a scene hop button 44 and a video stream hop button 46, which the user activates to initiate a content hop to a similar scene or a similar video stream, respectively, on the hard disk 12. For more complex control operations, an optional on-screen pointer 48 superimposed on the display 22 by the personal video recorder 10 is maneuvered using the remote controller 40 to perform selections from a displayed selection menu generated by the personal video recorder 10.

Figure 2:
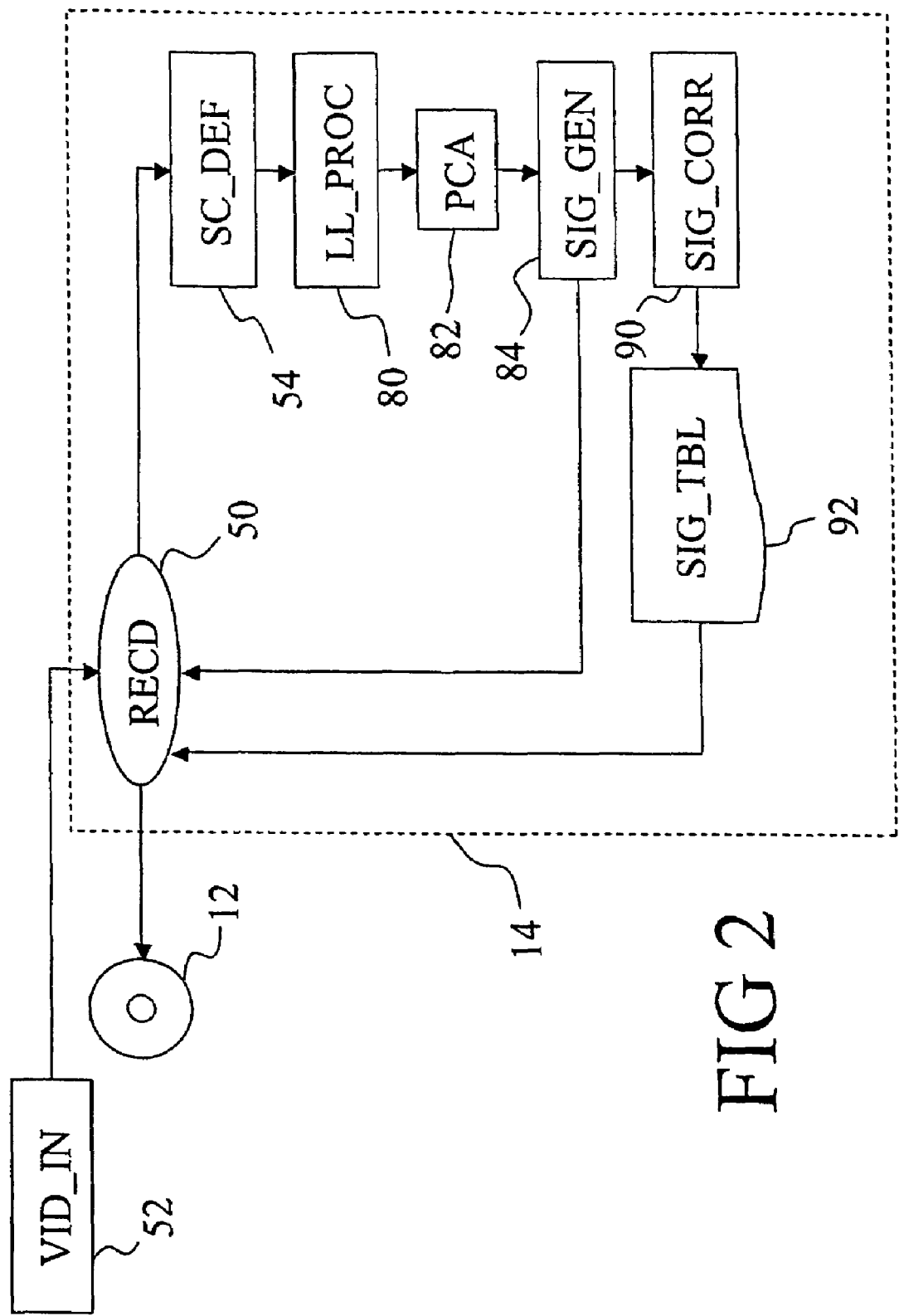

With continuing reference to FIG. 1 and with further reference to FIG. 2, the personal video recorder 10 includes a video recording component 50 that records video input 52 received from the satellite television tuner 30 or other external video input source to the hard disk 12 or other mass storage device. Concurrently or subsequently to the recording, a scene definition processor 54 defines overlapping scenes in the video content.

Figure 3:
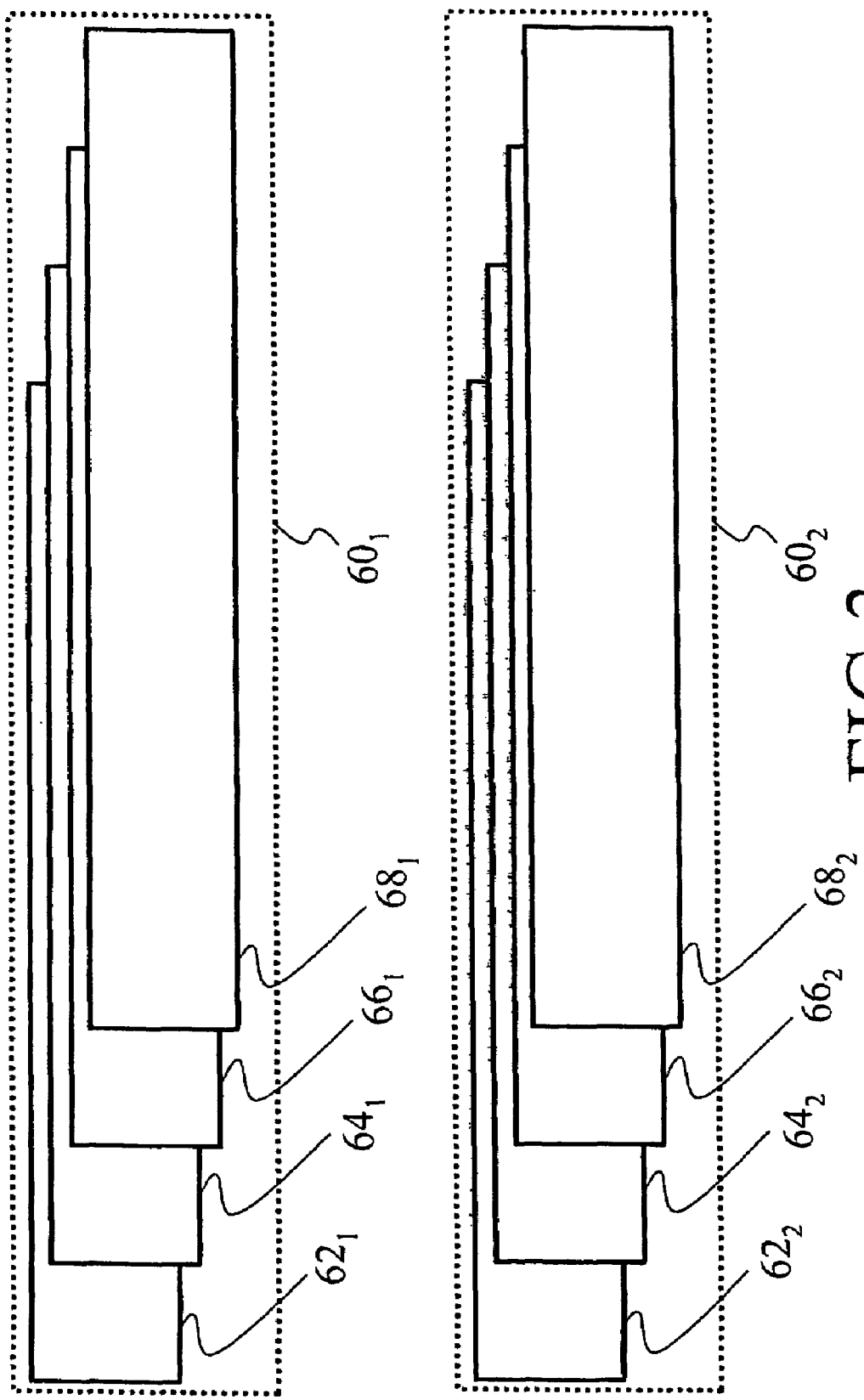

With continuing reference to FIG. 2 and with further reference to FIG. 3, the scene definition processor 54 receives video content and defines overlapping intervals corresponding to scenes. Specifically, FIG. 3 shows two video streams 60$_1$, 60$_2$, which are parsed into overlapping scene intervals corresponding to scenes such as the overlapping scenes 62$_1$, 64$_1$, 66$_1$, 68$_1$ of the video stream 60$_1$, or the overlapping scenes 62$_2$, 64$_2$, 66$_2$, 68$_2$ of the video stream 60$_2$. In a suitable embodiment, each scene is between thirty seconds and ten minutes long. In one preferred embodiment, two minute scenes are spaced in overlapping fashion commencing at ten second intervals. Scene lengths and spacings are suitably determined based on a characteristic of the video content, such as an amount of activity occurring in the video content. For example, an action video preferably has shorter and more closely overlapped scenes than a video of a slower cinematic genre. It is contemplated for the scene definition processor 54 to select scene length and overlapping spacing based on a motion parameter or other characteristic of the video content.

With returning reference to FIG. 2, each scene is processed to generate a scene signature. A low level features processor 80 computes low level audio and/or video content features on a frame-by-frame or small group of frames (for example, a group of pictures (GOP)) basis. Suitable low level features include an absolute average luminance parameter, an image luminance difference parameter, a frame complexity parameter, a mean absolute difference (MAD) motion estimation parameter, a motion parameter, an image texture parameter, a color distribution parameter, a scene composition parameter (e.g., defined in terms of objects, or in terms of psycho-acoustic features), or the like. For each scene, a principle components analyzer (PCA) 82 projects the low level features into a principle components space as principle components vectors. As is known in the art, a small number of principle components can be selected that represent a substantial amount of information about the low-level features. This substantially reduces memory usage, improves similarity measure robustness and similarity computation complexity. Moreover, because PCA features are scalable in representation accuracy, a tradeoff can be made between a number of low level PCA features and consequent accuracy in representation on one side, versus memory usage, robustness, and computational complexity. Although principle components analysis is a preferred framework for computing scene signatures, other methods can be employed. For example, averages or other statistical summaries of one or a few selected low level features can be used for computing scene signatures.

A scene signature generator 84 computes a suitable quantitative scene signature for each scene based on the principle component vectors of individual frames or groups of frames of the scene. Such signatures can range from short-term signatures spanning a group of frames (that is, signatures at about a length of a GOP level PCA feature), to mid-term signatures that combine GOP level PCA features over a few minutes (that is, at about the scene length), to long-term signatures that are representative of an entire video stream or a substantial fraction thereof. Preferably, mid-term signatures that are representative of the scene are employed. Such mid-term signatures are suitably computed within the PCA framework at a GOP level according to:

$$\overline{P} = \frac{1}{N_{GOP}} \sum_{i=1}^{N_{GOP}} P(k-i+1) \qquad (1)$$

where:

$$P(k) = [P_1(k) P_2(k) \ldots P_L(k)] \qquad (2)$$

is a principle components vector of the kth GOP within the scene, L is a number of PCA features or principle components used in defining the principle components vector P(k), and $N_{GOP}$ is a number of GOPs in a signature interval $T_{mt}$. Typically, principle components which exhibit large (preferably largest) variance are selected as the L components used in constructing P(k). The signature interval $T_{mt}$ typically corresponds to the scene length. A standard deviation feature vector for an nth feature is given by:

$$\sigma_n(k) = \sqrt{\frac{1}{N_{GOP}-1} \sum_{i=1}^{N_{GOP}} (P_n(k-i+1) - \overline{P}_n(k))^2} \qquad (3)$$

where again k indexes the GOPs in the scene and ranges from 1 to $N_{GOP}$. A standard deviation vector of the principle components vector is given by:

$$\sigma(k) = [\sigma_1(k) \sigma_2(k) \ldots \sigma_L(k)] \qquad (4)$$

where yet again k indexes the GOPs in the scene and ranges from 1 to $N_{GOP}$. A suitable quantitative mid-term PCA-based signature is then computed according to:

$$S(k) = [\overline{P}(k) \sigma(k)] \qquad (5).$$

A preferred PCA-based mid-term scene signature is specified in Equation (5). However, other scene signatures can be employed, such as an average short-term event distribution (e.g., a number of video transitions and/or a number of black-frame occurrences in the scene interval $T_{mt}$) or a mean or standard deviation of a low level feature such as an average luminance parameter, a frame complexity parameter, a mean absolute difference (MAD) parameter, a motion parameter or combination of the above mentioned alternatives. However, the PCA framework has an advantage as a scene signature in that the principle component values are readily scaled.

To facilitate rapid comparison of scene signatures during scene hopping, the scene signatures of the video content are preferably processed by a scene signatures correlation processor 90 to sort or arrange the scene signatures into a rapidly searchable scene signatures tabulation 92 that is written onto the hard disk 12 or other storage medium by the video recording component 50. Pre-correlation of scene signatures is suitably performed using algorithms typically employed in generating searchable databases. Preferably, the scene signatures are generated as audio/video data is recorded and the scene signatures are stored in a searchable scene signatures table 92 on the hard disk 12. By organizing scene signatures by relative similarity, similar scenes can be later identified more quickly. Alternatively, the controller can process recently recorded data in a post-recording operation to generate the signatures.

Figure 4:
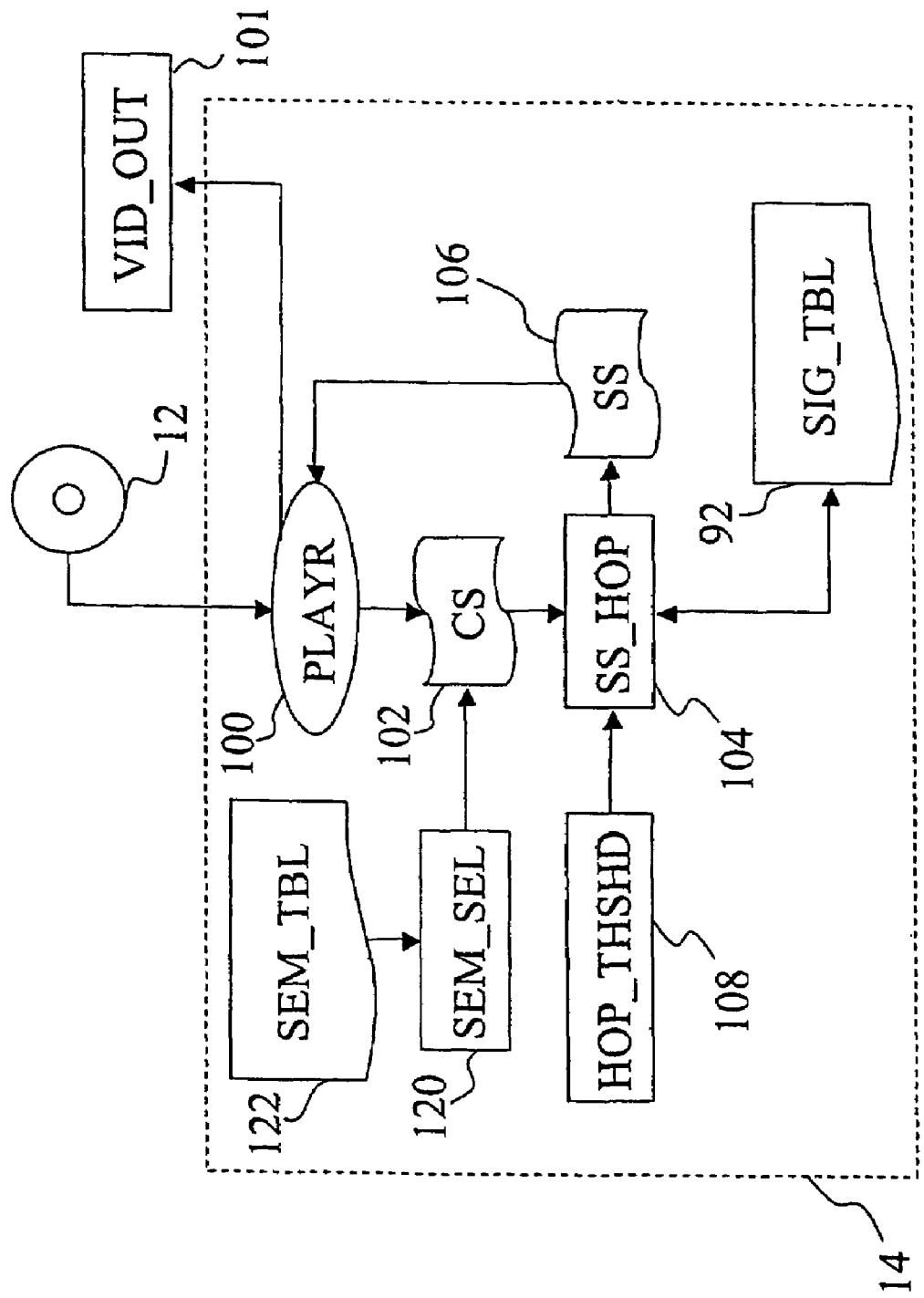

With returning reference to FIG. 1 and with further reference to FIG. 4, a video playback component 100 of the personal video recorder 10 plays back prerecorded multimedia content stored on the hard disk 12 or other mass storage device to produce an output such as an audio video output 101 that is sent to the entertainment system 20. A user operates the scene hop button 44 of the remote controller 40 to select a scene hop. The scene hop button 44 preferably can be selected at any time during video playback to initiate a content-based scene hop. Activation of the scene hop button 44 identifies a current scene 102 that corresponds to a scene being played back by the video playback component 100 when the scene hop button 44 is activated.

A similar scene hop processor 104 receives the current scene 102 and accesses the searchable scene signatures table 92 to identify a corresponding similar scene signature. In the case of the hard disk 12 storage medium of the personal video recorder 10, the video content was recorded by the personal video recorder 10 and the searchable scene signatures table 92 was suitably generated and prerecorded on the hard disk 12 as described previously with reference to FIG. 2. In the case of a read-only medium such as a read-only optical disk containing video content generated by a commercial vendor, the searchable scene signatures table 92 is suitably prerecorded on the optical disk by the commercial vendor.

With a current scene signature selected, scene matching is suitably performed by calculating a Euclidean distance between the current scene signature and other available signatures. The Euclidean distance between the current scene signature and another scene signature is given by:

$$d_{scene}(i,j) = (S(i)-S(j))(S(i)-S(j))^T \quad (6)$$

where the index i corresponds to the current scene, S(i) is the current scene signature, the index j corresponds to the other scene (j≠i), and S(j) is the scene signature of the other scene. The similar scene hop processor 104 computes $d_{scene}(i,j)$ for every other scene (that is, for all scene indices j except for j=i) and selects the scene having the smallest corresponding Euclidean distance $d_{scene}(i,j)$. Rather than using a Euclidean distance, other signature comparison figures of merit can be employed, such as an absolute difference according to:

$$d_{scene}(i,j) = \sum_{p=1}^{2L} \text{abs}(S_p(i) - S_p(j)). \quad (7)$$

If the identified minimum Euclidean distance is smaller than a hop threshold, then the corresponding scene is selected as a similar scene 106. This similar scene 106 is input to the video playback component 100, which hops to the address of the similar scene on the hard disk 12 or other memory and plays from that point. If, however, the identified minimum Euclidean distance is larger than the hop threshold, no hop is performed. In such a case, the user could be notified that no appropriate match was found, for example by a sound, or by an icon or message that is briefly displayed on the screen indicating that no appropriate match was found.

Figure 5:
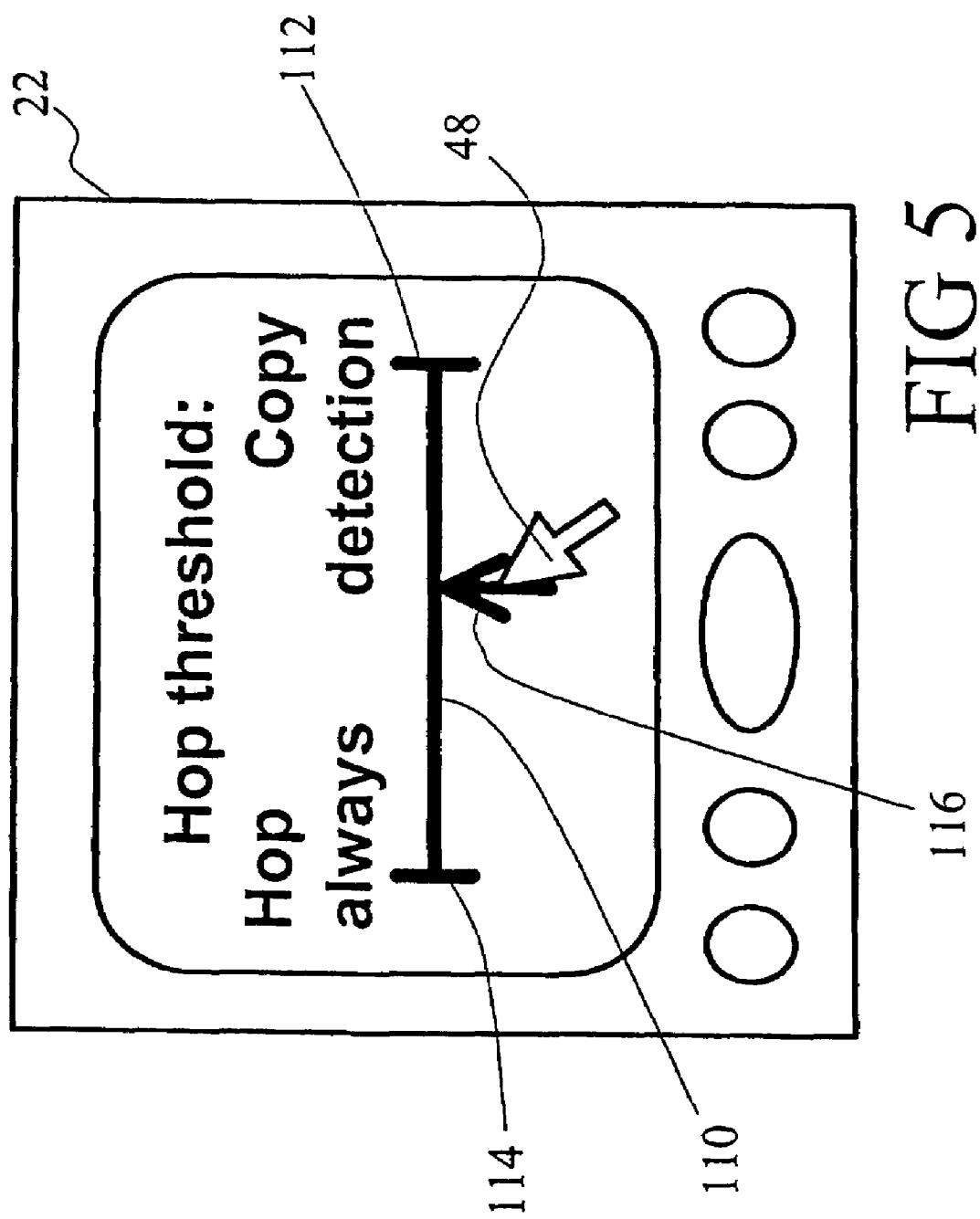
FIG. 5 shows an exemplary hop threshold scale.

With continuing reference to FIG. 4 and with further reference to FIG. 5, a hop threshold processor 108 preferably enables the user to select the hop threshold used by the similar scene hop processor 104. In one suitable approach shown in FIG. 5, the hop threshold processor 108 provides the user with a hop threshold scale 110, shown on the display device 22, which ranges continuously or in discrete steps between a minimum threshold corresponding to a more similar setting and a maximum threshold corresponding to a more different setting. In a preferred embodiment, the minimum threshold is a copy detection setting 112 in which hopping only occurs if an exact match is found. The maximum threshold is preferably a hop always setting 114 in which hopping occurs regardless of how dissimilar the match is. The extremes are copy detection 112 and hop always 114. The maximum, middle, and minimum thresholds are suitably selected in the design phase by analyzing distributions of similarity measure values over a large sampling of audio/video content. For the more similar or copy detection setting 112, a scene hop will not be performed unless the similar scene hop processor 104 locates a substantially similar scene or another copy of the same scene, that is, a scene with a scene signature quantitatively substantially similar to or the same as the current scene signature. For the more different or hop always setting 114, a scene hop will occur even if the scene has much less similarity to the current scene signature. The user selects the hop threshold by manipulating a threshold pointer 116 using the on-screen pointer 48 superimposed on the display 22, or by manipulating other buttons or controls of the remote control 40.

In one embodiment, the threshold is used to decide whether to jump to the scene whose signature is closest to the current scene signature. This blocks jumping to another scene if the closest scene is substantially dissimilar to the current scene. However, the hop threshold can be used in other ways. For example, rather than examining every other scene in the video stream, the similar scene hop processor 104 can randomly (or pseudo-randomly) compare signatures of other scenes with the current scene signature, and select as the similar scene 106 the first scene encountered in the random sampling whose signature is within the hop threshold of current scene signature. In this approach, the similar scene 106 may not be the most similar scene, but it is similar within the threshold value. This approach suitably enables the user to expand the hopping to a wider range of scenes, especially if the hop threshold is set close to the hop always setting 114. Optionally, the similar scene hop processor 104 can be configured to perform the hopping using a selected one of two or more modes, such as: (i) checking all scenes and hopping to the closest scene if it is within the hop threshold; (ii) randomly checking scenes and hopping when one is found that is within the hop threshold of the current scene signature; and (iii) hopping to a randomly selected scene. In the latter mode (iii), there is no similarity comparison performed, and purely random or pseudorandom hopping is produced.

Moreover, the hop threshold processor 108 is optionally omitted. This can be done for example by employing a fixed hop threshold, or by not using a hop threshold. If the hop threshold is not used, the scene with the smallest Euclidean distance $d_{scene}(i,j)$, smallest absolute distance, or other optimized signature comparison figure of merit is selected as the similar scene 106, and the scene hop is performed regardless of the Euclidean distance, absolute distance, or other signature comparison figure of merit.

Figure 6:
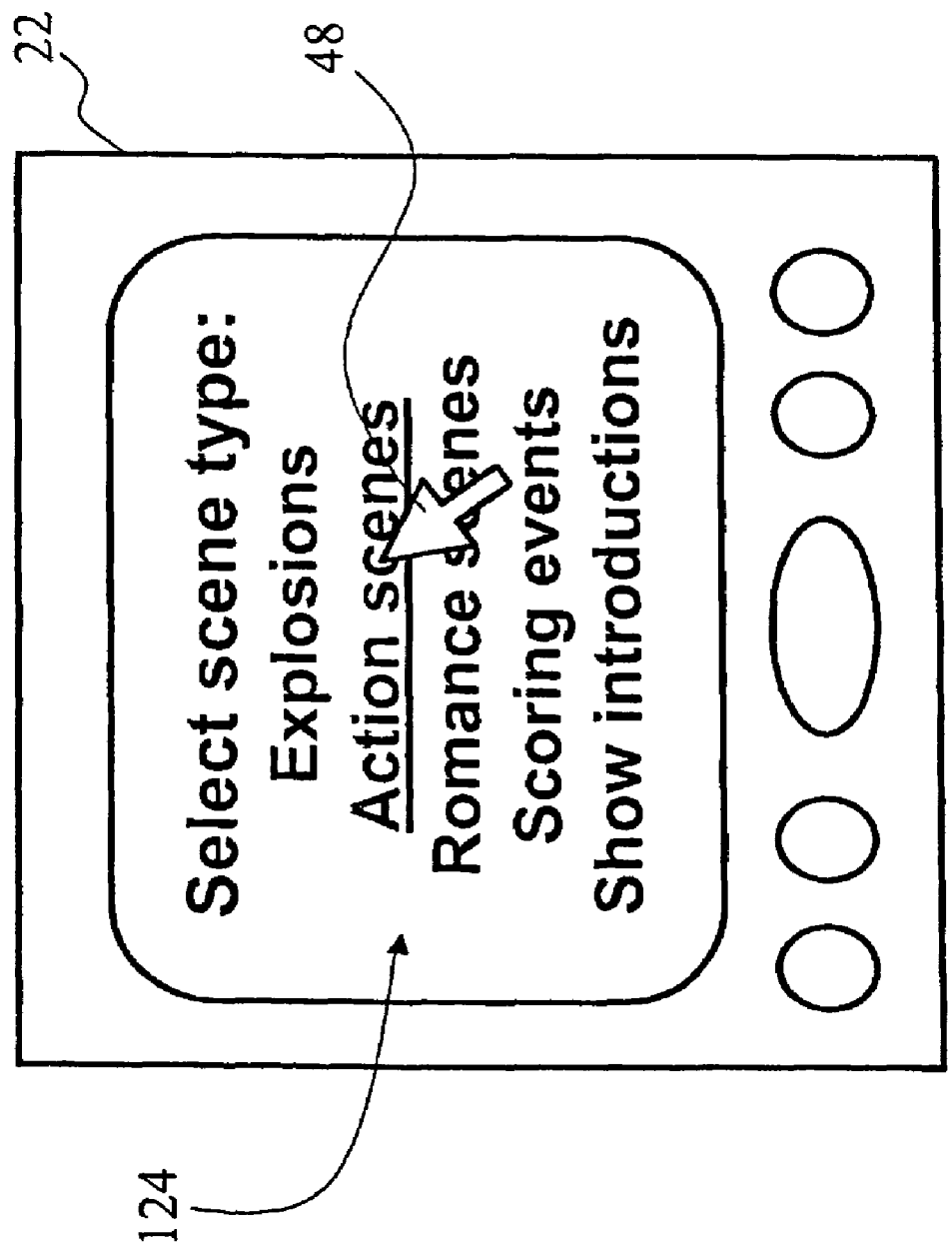
FIG. 6 shows an exemplary semantic scenes selection menu.

With continuing reference to FIG. 4 and with further reference to FIG. 6, rather than using the current scene as a reference for comparison, a selected type of scene can be used for reference. A semantic scene selection processor 120 suitably selects a characteristic scene for the scene comparison. The semantic scene selection processor 120 accesses a semantic scenes table 122 which contains exemplary scenes or scene signatures for commonly encountered cinematic scenes, such as explosion scenes, action scenes, romance scenes, sports scoring scenes, television show introductions, or the like, along with a semantic label for each scene or scene signature. The semantic scene selection processor 120 displays a semantic scenes selection menu 124 (see FIG. 6) on the display device 22, and the user employs the on-screen pointer 48 or another selection control to select a scene of interest, such as an action scene. This scene is selected as the current scene 102, and a corresponding similar scene in the video content is selected by the similar scene hop processor 104 as described previously. A semantic scene class could consist of multiple signature (scene) examples, provided by the user or an external service. The most similar scene found is the scene with the smallest distance to one of the examples in the class.

With returning reference to FIG. 1 and with further reference to FIG. 7, the video stream hop button 46 preferably can also be selected at any time during operation of the video playback component 100, to initiate a hop to a similar video stream. A user operates the video stream hop button 46 of the remote controller 40 to select a video stream hop. Activation of the video stream hop button 46 identifies a current video stream 202 that corresponds to a video stream being played back by the video playback component 100 when the video stream hop button 46 is activated.

A video stream hop processor 204 receives the current video stream 202 and compares the stream with other video streams recorded on the hard disk 12. In one suitable method, two video streams are correlated by computing a similarity for each cross-pair of scene signatures, and averaging or otherwise summarizing the cross-pair similarities. That is, to compute a correlation of video streams A and B, cross-pair similarities are computed between a first scene signature of the video stream A and each scene signature of the video stream B. This is repeated for each scene signature of the video stream A to produce the cross-pairs, which are then averaged.

More specifically, with a current video stream 202 selected, video stream matching is suitably performed by quantitatively comparing streams according to:

$$d_{stream}(k, m) = \frac{1}{N_k} \sum_{i \in S_k} \min(d_{scene}(i, j) \mid j \in S_m) \quad (8)$$

where $S_k$ is a set of $N_k$ signatures of the current video stream 202, and $S_m$ is a set of signatures of another video stream m. A most similar video stream ($m_{best}$) 206 is identified by a minimum stream comparison index $d_{stream}(k,l)$ given by:

$$m_{best} = \operatorname{argmin}(d_{stream}(k,m)) \quad (9)$$

where the index m runs over all video streams recorded on the hard disk 12.

Similarly to the scene hopping of FIG. 4, the stream hopping of FIG. 7 optionally incorporates a stream hop threshold. In one suitable approach, a hop to the most similar video stream 206 is not performed if the minimum stream distance value $d_{stream}(k,m_{best})$ is greater than the video stream hop threshold. In another suitable approach, the video stream hop processor 204 selects the first stream whose quantitative video streams comparison figure of merit (such as the exemplary video streams figure of merit $d_{stream}(k,m)$ given in Equation (8)) is below the video stream hop threshold. The video stream hop threshold is suitably selected by a graphical video stream hop threshold scale produced by a video stream hop threshold processor 208 that is generally similar to the scene hop threshold processor 108. The stream hopping is optionally configurable to enable two or more stream hopping modes, such as: (i) checking all streams and hopping to the closest stream if the corresponding distance value is within the stream hop threshold; (ii) randomly checking streams and hopping to the first stream whose corresponding distance value is within the stream hop threshold; and (iii) hopping randomly to another stream. In the latter mode (iii), no similarity comparison is performed, and purely random or pseudo-random stream hopping is performed.

Moreover, the stream hopping of FIG. 7 optionally incorporates a semantic stream hopping option using a semantic video stream selection processor 220 that selects a characteristic video stream for the comparison. The semantic video stream selection processor 220 accesses a semantic video streams table 222 which contains exemplary semantically labeled video stream classes for commonly encountered cinematic types, such as action movies, romance movies, sports offerings, television comedies, or the like. Preferably, the semantic video stream selection processor 220 employs a video stream selection menu similar to the semantic scenes selection menu 124 of FIG. 6. The user selects a characteristic video stream class, which is input as the current video stream 202 to the video stream hop processor 204 to search for a similar video stream on the hard disk 12. A suitable semantic stream class could include several signature sequences representative of exemplary video streams matching that class, which are provided by the user or by an external service. The most similar stream found is the stream with the smallest distance to one of the examples in the class.

Embodiments have been described with reference to a personal video recorder. However, similar content-based hopping can be incorporated into a video or multimedia player that does not include record capability. Content-based hopping can also be used with other recording media besides hard disks, such as magnetic tapes, optical disks, or electronic storage units. Moreover, similar content-based hopping can be used with other types of content such as audio streams, electronic documents, computer software, or the like. Content hopping can also be used to monitor a plurality of real time content streams for a selected type of content. For example, a cable, broadcast, or satellite television system can be monitored for a scoring event of a televised sports game. (This can be done, for example, by referencing exemplary scoring event signatures stored in the semantic scenes table 122). Similarly, a broadcast or digital radio system can be monitored for a selected song or type of music. When the selected target content is sensed on one of the monitored streams, the display hops to the stream with the sensed target content.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiments, the invention is now claimed to be:

1. An apparatus for playing video content, the apparatus including:
    a video content storage that stores at least one video stream;
    a scene defining processor that defines overlapping scene intervals including a time spacing between beginnings of overlapping scene intervals in the at least one video stream, wherein the time spacing between the beginnings of overlapping scene intervals is selected based on a characteristic of the at least one video stream;
    a signature processor that computes a scene signature for each of the overlapping scene intervals, the video content storage storing the scene signatures of the at least one video stream;
    a selector that selects a scene signature which is descriptive of video content of a scene a user wants to view;
    a comparator that compares the selected scene signature with scene signatures of the stored at least one video stream to identify one or more scenes whose scene signature is similar to the selected scene signature; and
    a player that plays the at least one scene whose scene signature is identified as similar to the selected scene signature.

2. The apparatus as set forth in claim 1, wherein each scene has a length between 30 seconds and 10 minutes, and the scenes of the stored at least one video streams stream are overlapped at intervals between 1 second and 2 minutes.

3. The apparatus as set forth in claim 1, wherein the scene signatures of the stored at least one video streams stream are constructed using principal components vectors, the principle components vectors being computed by principle component analysis of selected low level features of the video content within the scene.

4. The apparatus as set forth in claim 3, wherein the low level features are selected from a group consisting of: an image luminance difference parameter, a frame complexity parameter, a mean absolute difference (MAD) motion estimation parameter, a motion parameter, and an image texture parameter.

5. The apparatus as set forth in claim 1, wherein the selector selects a scene signature of a currently playing scene as the selected scene signature.

6. The apparatus as set forth in claim 1, wherein the comparator identifies a similar scene, which has a smallest signature comparison figure of merit relative to the selected scene signature.

7. The apparatus as set forth in claim 1, wherein the comparator determines whether the stored scene signatures of the stored at least one video streams stream are similar to the selected signature within a predetermined threshold, the player playing a scene whose signature is within the threshold.

8. The apparatus as set forth in claim 7, further including:
    a threshold selector that selects the threshold value.

9. The apparatus as set forth in claim 1, wherein the video content includes a plurality of video streams, and the apparatus further includes:
    a stream hop selector that selects a current stream which the player is playing; and
    a stream hopper that compares scene signatures of scenes of the current stream with scene signatures of the plurality of video streams to identify a similar video stream, the stream hopper causes the player to transfer the playing to the similar stream.

10. The apparatus as set forth in claim 1, further including:
    a scene signatures table for storing the scene signatures arranged by similarity between the scene signatures, the comparator accesses the scene signatures table to identify the similar scenes.

11. The apparatus as set forth in claim 10, wherein the signature processor stores the scene signatures in the scene signatures table.

12. The apparatus as set forth in claim 11, wherein the signature processor includes:
    a low level feature processor that computes one or more low level video content features;
    a principle components projector that projects the low level video content features onto a principle components space to define principle components vectors; and
    a scene signature generator that combines the principle components vectors of each scene to define the corresponding scene signature.

13. The apparatus as set forth in claim 11, further including:
    a recorder that records video content, the signature processor computes the scene signatures as the video content is recorded.

14. The apparatus as set forth in claim 1, wherein the scene defining processor selects the spacing between a beginning of each of the overlapping scene intervals based on an amount of activity occurring in the at least one video stream.

15. The apparatus as set forth in claim 1, wherein the selector selects the scene signature from a group of semantically identified scene signature values.

16. A method for playing video content, the method including:
    defining overlapping scene intervals including a time spacing between beginnings of overlapping scene intervals in at least one stored video stream, each scene interval defining a scene, wherein defining overlapping scene intervals includes selecting the time spacing between the beginnings of overlapping scene intervals based on a characteristic of the at least one video stream;
    computing a scene signature over each overlapping scene interval, the computed scene signature describing a composite of characteristics of frames of the scene;
    storing the computed scene signatures;
    selecting a scene signature;
    comparing the selected scene signature with the stored scene signatures which describe overlapping scenes of at least one stored video stream to identify at least one scene signature that is similar to the selected scene signature; and
    playing at least one scene whose scene signature is identified as similar to the selected stream signature.

17. The method as set forth in claim 16, wherein the comparing of the selected scene signature with the stored scene signatures includes:
    computing a scene comparison figure of merit comparing the selected scene signature and each compared scene signature of the stored scene signatures;

quantitatively comparing the scene comparison figure of merit with a threshold; and based on the computing and quantitative comparing, selecting the similar scene signature.

18. The method as set forth in claim 16, further including:

computing the stored scene signatures based on motion parameters of the at least one video stream.

19. The method as set forth in claim 18, wherein the computing of the stored scene signatures includes:

performing principle components analysis of the motion parameters to produce principle component vectors; and combining the principle component vectors within the each scene to define the corresponding scene signature.

20. The method as set forth in claim 18, further including:

recording the at least one stored video stream prior to the selecting, the computing of the stored scene signatures being performed during the recording.

21. The method as set forth in claim 16, wherein defining overlapping scene intervals includes selecting the spacing between a beginning of each of the overlapping scene intervals based on an amount of activity occurring in the at least one video stream.

22. The apparatus as set forth in claim 1, wherein the scene defining processor selects the spacing between a beginning of each of the overlapping scene intervals such that an action video has shorter and more closely overlapped scene intervals than a video of a slower cinematic genre.

23. The method as set forth in claim 16, wherein the defining overlapping scene intervals includes selecting the spacing between a beginning of each of the overlapping scene intervals such that an action video has shorter and more closely overlapped scene intervals than a video of a slower cinematic genre.

* * * * *